United States Defensive Publication [19] (H) [11] T989,002
Gorin [43] Dec. 4, 1979

[54] SOLVENT MAKEUP IN HYDROGEN TRANSFER EXTRACTION

[75] Inventor: Everett Gorin, San Rafael, Calif.

[73] Assignee: Continental Oil Company, Stamford, Conn.

[21] Appl. No.: 969,616

[22] Filed: Dec. 14, 1978

[51] Int. Cl.[2] ..... C10G 1/00; C10G 1/06
[52] U.S. Cl. ..... 208/8 LE; 208/10

[57] ABSTRACT

A coal liquefaction process is provided in which a hydrogen donor solvent is used in the liquefaction of the coal. The process is designed to maintain the hydrogen donor solvent in balance by hydrogenation of the spent hydrogen donor solvent and precursors of the hydrogen donor solvent which are generated in steps of the overall liquefaction process. The principal sources of the desired hydrogenatable precursors are a solids-free and benzene insolubles-free portion of the coal extract, and particularly the coker distillates generated by coking a non-distillable hydrocracked fraction of said solids-free and benzene insolubles-free portion.

1 Claim, 1 Sheet Drawing,

15 Pages Specification

The file of this unexamined application may be inspected and copies thereof may be purchased (849 O.G. 1221, Apr. 9, 1968).

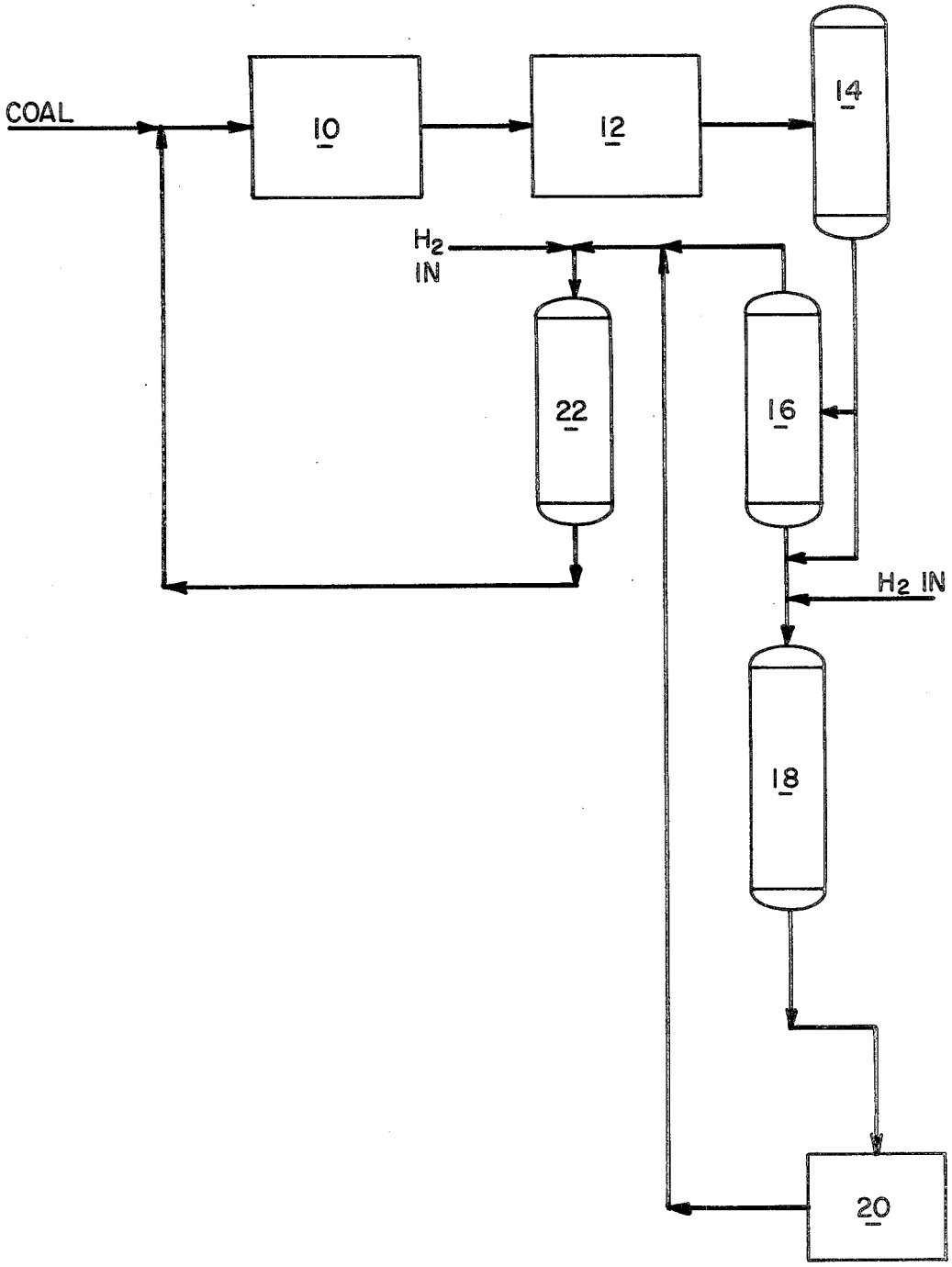
COAL
10
12
14
$H_2$ IN
22
16
$H_2$ IN
18
20